Oct. 6, 1959    B. MOLL ET AL    2,907,390
METHOD OF TREATING WELLS
Filed June 16, 1953    2 Sheets-Sheet 1

INVENTORS
BERNHARD MOLL, OTTO KRIEGBAUM
BY
their ATTORNEYS

Oct. 6, 1959     B. MOLL ET AL     2,907,390
METHOD OF TREATING WELLS

Filed June 16, 1953     2 Sheets-Sheet 2

INVENTORS
BERNHARD MOLL, OTTO KRIEGBAUM

BY Connolly and Hutz
ATTORNEYS

United States Patent Office 2,907,390
Patented Oct. 6, 1959

2,907,390
METHOD OF TREATING WELLS

Bernhard Moll, Wesseling, and Otto Kriegbaum, Furth, Germany, assignors of one-half to Union Rheinische Braunkohlen Kraftstoff Aktiengesellschaft, Wesseling, Germany, and one-half to said Otto Kriegbaum Application June 16, 1953, Serial No. 362,042

Claims priority, application Germany September 26, 1952

2 Claims. (Cl. 166—44)

This invention relates to an improvement of a method of, and means for, starting, maintaining and increasing the production of wells by improving the flowing conditions in the formation and filter beds.

In our Patent No. 2,768,694, issued October 30, 1956, we have described a method of, and a device for, forming and renewing wells which comprises supplying a pressure medium, for instance compressed air, into a well bore after tightly closing the top of the well and forcing this pressure medium to penetrate the producing strata surrounding the well bore in countercurrent to the normal flow of fluid. By stopping the supply of the pressure medium and allowing normal inflow of fluid into the well bore the injected gaseous pressure medium is expanded to many times its original volume, thus loosening the accumulation in the formation about the well. The loosened sand and mud particles are carried along by the recovered normal flow of fluid so that the permeability of the formation is improved.

The above described method can have the desired effect only within a limited radius of the bore hole. The area which is cleaned from sand and mud so that the flow of fluid is accelerated is the larger the higher the pressure applied to force the fluid to flow back, i.e. away from the bore hole. As a matter of fact, it is not practical to apply higher pressures when the filter bed consists of a material that will not withstand high stresses, for instance ceramic materials. In these cases it is not possible to increase the pressure so as to force the pressure medium to penetrate more distant regions of the producing strata.

In accordance with the present invention we have found an improved method of, and means for, maintaining and increasing the flow of wells by loosening and removing accumulations of sand and mud in filter beds and producing strata inside a wider area about a bore hole by supplying a pressure medium, for instance compressed air or pressure water, into the formation at various places within a certain range about the bore hole. The area in the productive formation, which is favorably influenced by effecting backflow of fluid according to the invention is substantially enlarged and, accordingly, the production rate of the well increased. The pressure medium can be supplied to the formation through tubings located in the vicinity of the well and terminating in the productive formation at a distance of said 2-5 meters from the bore hole. As a matter of fact, the supply of the pressure medium through these additional tubings, which are perforated at their lower parts, is performed in proper relation to the service of the well, as will be more fully explained below.

The arrangement of additional tubings according to the invention does not involve considerable expense; moreover, these tubings can be removed after operation.

The flow of fluid and the production of a well can be started or increased by the hereindescribed method in the following manner. The well is hermetically sealed on top and provided with connection pipes for supplying a pressure medium, for instance compressed air or pressure water. A number of tubings, which are perforated at their lower parts and provided with connection pipes for supplying the pressure medium, are sunk into the producing strata about the bore hole. When introducing the pressure medium through the well bore to migrate into the formation and to force the fluid to flow back, the same pressure medium is simultaneously injected through the tubings located about the well bore. The area about the well bore, which is now under pressure, is substantially enlarged as compared with that engaged by supplying the pressure medium through the well bore exclusively.

By inducing upward flow in the well bore, which is accomplished by means of a pump, for instance an airlift pump, the normal flow of fluid is recovered and the injected pressure medium flows back towards the bore hole while increasing in volume as far as a gaseous pressure medium is concerned. Accumulations in the filter bed and the surrounding strata are thus loosened, and fine and finest sand and mud particles are carried along into the bore hole. Since the area under pressure was essentially larger than that engaged by supplying the pressure medium through the well bore only, the effect on the flowing conditions in the productive formation is greater and can be further increased by maintaining the pressure in the additional tubings during the upward movement in the bore hole. In the latter case, further quantities of the pressure medium are supplied to the formation and promote the flow of fluid towards the bore hole so that the production rate of the well is further increased. As described in our Patent No. 2,768,694 issued October 30, 1956, the application of pressure and intermittent recovery of the normal flow of fluid is repeated several times.

It is within the scope of the invention to supply the pressure medium through additional tubings designed so as to allow the delivery of fluid and sand particles to the surface. In this case the diameter of the tubings is enlarged to a certain extent, and pumps, for instance airlift pumps, are located in the tubings. According to this embodiment of the invention the fluid and sand particles in the formation can be delivered to the surface by inducing upward flow in the additional tubings while, at the same time, the pressure medium is injected into the formation through the well bore to force the fluid and the entrained sand particles to flow towards the additional tubings located at some distance from the bore hole. After some time the well is operated to deliver oil or water while the additional tubings are used to supply the pressure medium. As described above the fluid and the pressure medium flow then from the additional tubings in the direction of the bore hole while carrying along finest sand particles which are delivered to the surface by inducing upward movement in the well. This process allows the removal of the sand in the oil or water bearing strata within a wider range about the well and is of particular advantage where the productive formation contains a higher portion of fine sand. Special arrangements to keep the additional tubings free from sand, for instance by means of filter beds or gravel packs, need not be taken since these tubings are contemplated to serve as wells for a limited period only and shall be removed later.

The process of the invention may also be adapted to remove, from the underground, strata containing fine sand, which are undesired in underground building. In this case it is of advantage to locate a great many tubings and to alternately operate part of the tubings to deliver sand to the surface while the rest is used for supplying the pressure medium to the underground.

Besides the pressure medium supplied to the formation by the hereindescribed method, appropriate chemical substances, that are capable of dissolving or loosening the strata and the filter beds clogged with sand, mud or other materials, or that lead to a partial combustion and to an increase in temperature and pressure in the formation, may be additionally injected according to the invention either before or during the introduction of the pressure medium. Examples of said chemical substances are those referred to in our Patent No. 2,768,694 issued October 30, 1956, viz. inorganic acids, such as hydrochloric acid, sulfuric acid, nitric acid and hydrofluoric acid; some organic acids forming water soluble salts, for instance oxalic acid and acetic acid; organic solvents such as alcohols, hydrocarbons and chlorinated hydrocarbons; furthermore, oxidizing agents, such as potassium permanganate, hydrogen peroxide, oxygen and substances splitting off or yielding oxygen. It is also possible to supply mixtures of the said substances.

The invention is further illustrated by way of example in the accompanying diagrammatic drawing, in which.

Figure 1:
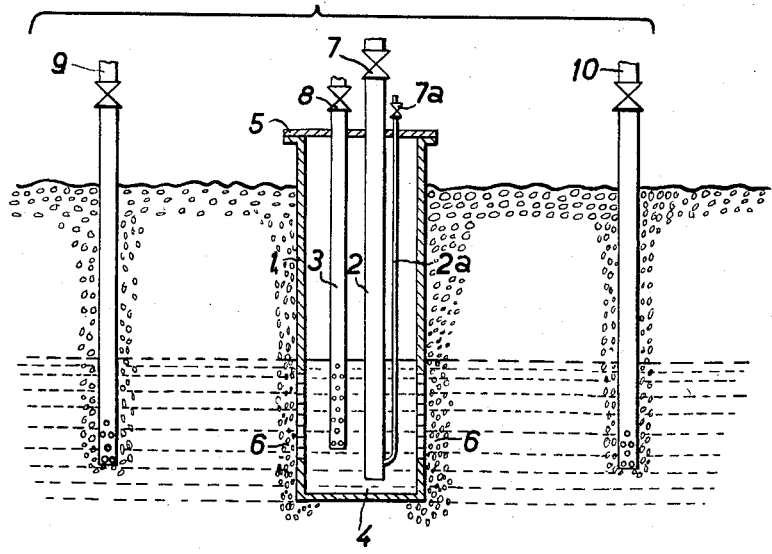
Fig. 1 is a sectional view showing a well bore and the additional tubings used in conjunction therewith.

Referring to Fig. 1, a filtering tube 1 extends into the underground and is closed at the bottom 4. That portion of the tubing adjacent the producing strata is perforated. Stand pipe 2 of an airlift pump, which is open at the bottom, extends into the well bore and connected with an air intake 2a. A scavenging duct 3 is also installed in the well bore. Air is excluded by leading all the ducts in an air-tight manner through plate 5 which hermetically seals the filtering tube 1. Backflow of fluid in the formation is induced by closing the slide valves 7 and 7a and introducing the pressure medium into the scavenging duct 3 through a side valve 8. To force the fluid to flow back into more distant ranges further quantities of the pressure medium are simultaneously injected to the formation through the additional tubings, surrounding the tube 1. These tubings, which are closed at the bottom and perforated at the lower parts, are provided on top with connection pipes 9 and 10 respectively for supplying the pressure medium. By closing the slide valve 8 (Fig. 1) and opening the slide valves 7 and 7a, fluid is delivered to the surface through the stand pipe 2 by the action of the pump while the injection of the pressure medium through the additional tubings is continued or stopped. As mentioned above, the additional tubings may be designed so as to allow the delivery of fluid therein by inducing upward flow by means of pumps located in these tubings as will now be described with respect to Fig. 2.

Figure 2:
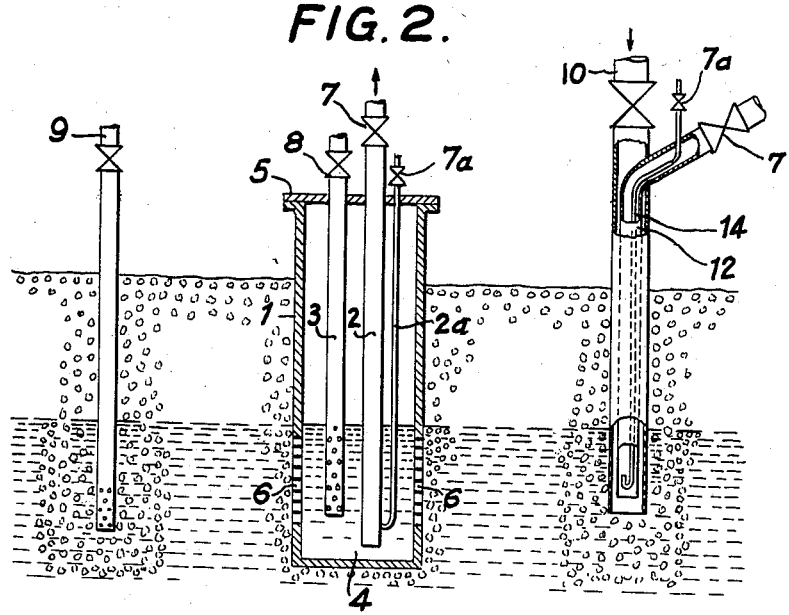
Fig. 2 is a sectional view of a second embodiment of the invention.

As seen in Fig. 2, the right hand tubing of Fig. 1 is modified to include such withdrawal means. The pressure fluid supply tube of the type used in the units surrounding the well is enlarged in diameter to house a stand pipe 12 of smaller diameter than the supply tube. An air intake tube 14 is positioned within the stand pipe 12 and is connected with an air pump (not shown). As seen in the drawing the stand pipe 12 extends through the supply tube wall near the upper end of the tube. The air intake in turn extends through that portion of the stand pipe tube wall which lies externally of the supply tube.

In operation, the main well and left-hand tubing operate as explained with reference to Fig. 1. With regard to the right-hand tubing a pressure fluid passes into the supply tube through connection 10, which is opened, and is discharged from the bottom portion of the tube as with the surrounding tubings of Fig. 1. The stand pipe tube and air intake are closed off. When ready to withdraw the earth particles and liquid from the earth formation, the connection 10 is closed, and the air lift pump is placed in operation as explained with respect to Fig. 1 with valves 7 and 7a being opened. The earth particles and liquid are then withdrawn through stand pipe 12.

We claim:

1. An improved method for maintaining and increasing the production of a well in a producing earth formation by removing mud and earth particles from the formation adjacent said well to thereby increase the permeability of the formation comprising the steps of positioning a plurality of supplementary wells around the well and spaced therefrom for a distance of 2 to 5 meters, said supplementary wells being in fluid communication with the well through the earth formation, injecting a pressure fluid into the well and into the supplementary wells, said pressure fluid being injected into each well to drive the same into the surrounding earth formation, continuing the pressure fluid application to build up the pressure of the pressure fluid and any formation fluid adjacent the wells, halting the flow of pressure fluid into the well while maintaining the flow of pressure fluid in at least some of the supplementary wells, thereafter withdrawing the fluid and loosened earth formation from the well, and periodically repeating the above cycle until all fluid withdrawn is substantially free of earth formation.

2. The method of claim 1 wherein the flow of pressure fluid is halted in some of the supplementary casings as well as in the well-casing, to permit a return flow of liquid and entrained particles through the well casing and supplementary casings while the flow of pressure fluid is maintained in the remaining supplementary casings.

References Cited in the file of this patent

UNITED STATES PATENTS

| | | |
|---|---|---|
| 468,365 | Robbins | Feb. 9, 1892 |
| 546,125 | Titus | Sept. 10, 1895 |
| 556,669 | Frasch | Mar. 17, 1896 |
| 657,951 | Mooney | Sept. 18, 1900 |
| 1,152,392 | Brietung et al. | Sept. 7, 1915 |
| 1,235,770 | Deats | Aug. 7, 1917 |
| 1,599,744 | Chapman | Sept. 14, 1926 |
| 2,171,416 | Lee | Aug. 29, 1939 |
| 2,309,697 | Gunderson | Feb. 2, 1943 |
| 2,354,570 | Benckenstein | July 25, 1944 |
| 2,548,059 | Ramsey | Apr. 10, 1951 |